Figure 1:
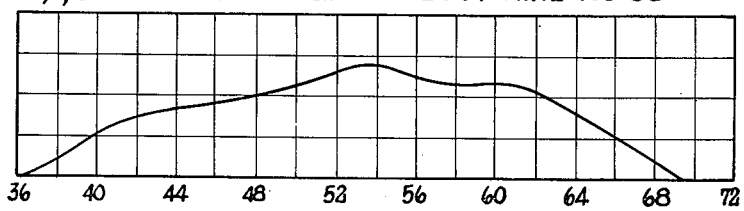

2,2',8-TRIMETHYLSELENOCARBOCYANINE IODIDE 2,2'-DIMETHYL-8-ETHYLSELENOCARBOCYANINE IODIDE 2,2',8-TRIETHYLSELENOCARBOCYANINE IODIDE

Patented Feb. 12, 1935

1,990,507

UNITED STATES PATENT OFFICE 1,990,507

PHOTOGRAPHIC EMULSIONS CONTAINING SELENOCARBOCYANINES

Frank L. White, Rochester, N. Y., assignor to Eastman Kodak Company, Rochester, N. Y., a corporation of New York Application August 27, 1931, Serial No. 559,776

17 Claims. (Cl. 95—7)

This invention relates to photographic emulsions and more particularly to gelatino silver halide emulsions containing a new class of photographic sensitizing dyes known as selenocarbocyanines.

As ordinary photographic emulsions are generally indifferent to those colors of the spectrum of longer wave length, various types of sensitizing dyes have been suggested for incorporation in photographic emulsions or for employing over emulsions as overcoatings, so as to increase the spectral sensitiveness thereof. The new dyes described herein depart from the class of most of those previously suggested in that they contain selenium in the nuclei which are condensed to form the dye.

An object of the present invention is to provide a process for the preparation of these selenocarbocyanine dyes and the incorporation of those dyes into photographic emulsions, as well as to provide the products resulting therefrom. Other objects will hereinafter appear, including the preparation of photographic elements from such emulsions.

I have found that dyes having excellent photographic sensitizing properties may be prepared by the treatment of a 1-methyl-benzoselenazole alkyl quaternary salt with an ortho-ester of a carboxylic acid, the acid corresponding to which contains more than one carbon atom in the molecule. The reaction may be advantageously carried out in boiling dry pyridine. The ortho-esters of the carboxylic acids which I have found particularly suitable include as ortho-esters of the aliphatic carboxylic acids, such ortho-esters as, trimethyl or triethyl orthoacetate, propionate, caproate, valerate and the like; as ortho-esters of the substituted aliphatic carboxylic acids, such esters as trimethyl or triethyl ortho-gamma-phenoxybutyrate and trimethyl or triethyl ortho-phenylacetate; and as ortho-esters of aromatic carboxylic acids such esters as trimethyl or triethyl orthobenzoate and trimethyl or triethyl ortho-p-toluate. Ortho-esters of substituted aromatic carboxylic acids may also be employed, such for example as where the aryl group (phenyl) is substituted by an alkyl group (methyl) or the like. The trimethyl and triethyl ortho-esters are illustrative and are not to be understood as limiting my invention to their use only. Instead of using trimethyl or triethyl orthoacetate I may use methyldiethyl or dimethylethyl orthoacetate; instead of trimethyl or triethyl orthopropionate one may employ dimethylethyl or ethyl-di-n-propyl orthopropionate and instead of using trimethyl or triethyl ortho-n-caproate I may use methyldiethyl ortho-n-caproate. In other words the alkoxy groups of the ortho-ester may be dissimilar, if desired.

The 1-methylbenzoselenazole has the following structural formula:

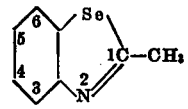

When this is acted upon by a compound having a suitable acid radical, such as methylsulphate, there is produced the 1-methylbenzoselenazole alkyl quaternary salt having the following structural formula:

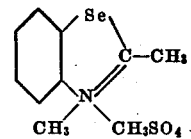

It will thus be noted that I employ a benzoselenazole which has a reactive methyl group in the 1-position.

When two molecular proportions of this 1-methylbenzoselenazole alkyl quarternary salt are condensed in the presence of dry pyridine, for instance, with one molecular proportion of an ortho-ester of a carboxylic acid, such as those described above, for instance, triethylorthoacetate, there occurs the following probable reaction:

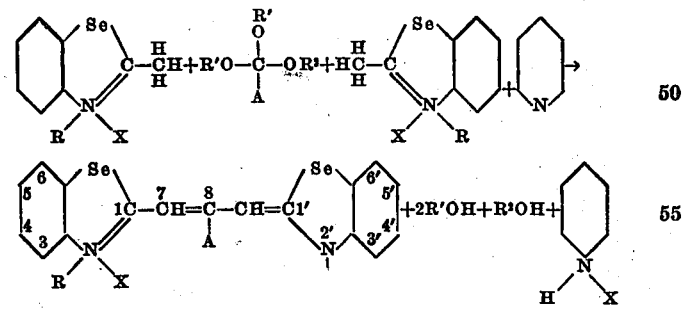

resulting in the formation of the dye shown.

This dye may be converted into a salt, other than the salt of formation by treating it in solution, with an aqueous solution of a salt containing a suitable acid radical such, for instance, as potassium iodide.

In the above structural formula R, R' and R² represents alkyl groups such, for instance, as methyl or ethyl and X a suitable acid radical. The character A stands for the substituent group to be introduced into the three carbon chain connecting the nuclei. This three carbon chain consists of three methenyl groups linked together as a trimethenyl chain having the structural formula:

This chain links together the benzoselenazole nuclei. The substituted group A replaces the hydrogen of the central carbon atom of this trimethenyl chain.

In practice, I have found that it is most desirable to carry out the foregoing condensation by the use of 1-methylbenzoselenazole methomethylsulphate. The dye so produced is conveniently isolated by double decomposition with ammonium or potassium iodide, or the like, in aqueous solution, by which the iodine atom replaces the acid radical represented by X.

The nomenclature and numbering of the above groups of compounds and intermediates are in accord with present usage and follow the system of numbering normally employed in connection with the known thiocarbocyanines. The numbering, of course, is arbitrary and is given for the guidance of those skilled in the art in order that there be no question as to the identity of the compounds covered by my invention.

The preparation of the 1-methylbenzoselenazole (used in the preparation of the dyes described herein) is given in the literature. It consists in general of the reaction of an excess of acetyl chloride or the zinc salt of ortho ortho'-diaminodiphenyldiselenide in some solvents such as dry benzene, first in the cold and later while heated. By adding water and then an excess of ammonium hydroxide the 1-methylbenzoselenazole goes into the benzene layer, from which, it is recovered and purified.

The ortho-esters of the carboxylic acids which I employ have been described in the literature, or in previous patent applications, such for instance as the applications Serial Nos. 505,982, 505,983 and 505,984 of L. G. S. Brooker filed December 31, 1930. The preparation of the 1-methylbenzoselenazole alkyl quaternary salt and of the dye is fully indicated in the following examples which are typical of the manner in which my invention may be carried out.

*Example I.*—*2:2'- 8 - trimethylselenocarbocyanine iodide.*—Three grams (2 mol.) of 1-methylbenzoselenazole were heated on a steam bath for several hours with 1.9 grams (2 mol.) of methylsulphate. Addition took place rapidly with the formation of 1-methylbenzoselenazole methomethylsulphate. To this crude solid quaternary salt was added 15 cc. of dry pyridine and 3 cc. (in excess of 1 mol.) of triethyl ortho-acetate which reaction mixture was heated under reflux with agitation until boiling occurred and the boiling continued gently for a few minutes, for instance 10 minutes. While still hot this reaction mixture was treated with 10 grams of potassium iodide in 20 cc. of water. Minute bluish crystals separated at once. Further separation occurred by standing aside to cool. The iodide of the dye, so produced, was filtered off and washed. The dye was purified by crystallization from methyl alcohol and was finally obtained as a dull purplish blue crystalline mass which gave a purplish-pink solution in methyl alcohol.

*Example II.*—*2:2'- dimethyl-8-ethylselenocarbocyanine iodide.*—Three grams (2 mol.) of 1-methylbenzoselenazole were heated with 1.9 grams (2 mol.) of methylsulphate on a steam bath for several hours. Addition occurred rapidly with the formation of 1-methylbenzoselenazole methomethylsulphate. To the crude solid quaternary salt thus produced was then added 15 cc. of dry pyridine together with 3 cc. (in excess of 1 mol.) of trimethyl ortho-propionate, the reaction mass being then heated over a free flame under reflux with agitation until boiling occurred, the boiling being continued for a few minutes, for instance 15 minutes. While still hot there was added to this reaction mixture a solution of 10 grams of potassium iodide in 20 cc. of water. The reaction mixture was then stood aside until separation of the crude dye occurred, which was then filtered off and washed. The crude dye was purified by boiling in acetone and filtering hot, leaving crude dark green crystals upon the filter. These crystals of the dye were further purified by crystallization from methyl alcohol and were finally obtained as dark green crystals, which gave a purple solution in methyl alcohol.

As indicated in the earlier portion of this specification, I may, instead of employing triethyl ortho-acetate or trimethyl ortho-propionate, employ any of the ortho-esters of carboxylic acids set forth above or ones similar thereto. By so doing it will be apparent that I may obtain at will a dye in which there is substituted in the 8-position of the trimethenyl chain, either an alkyl group, a substituted alkyl group or an aryl or substituted aryl group. Thus, the letter A in the above structural formula indicates any of these groupings. As before indicated, various alkyl groups may be employed in the portion indicated by the letter R to obtain different dyes of varying properties. While I have obtained the best yields by employing the 1-methylbenzoselenazole methomethylsulphate in my condensations, 1-methylbenzoselenazole alkyl quaternary salts including many other suitable acid radicals may be employed in my condensations; in fact I may employ an alkyl quaternary salt having any salt forming acid radical that will not render the dye formed therefrom too sparingly soluble or deleteriously affect the photographic sensitizing properties of the dye such, for example, as a halide, para-toluenesulphonate, nitrate, acetate, perchlorate or the like, although I have been unable to obtain as good yields, when employing such acid radicals in the alkyl quaternary salts as where I have employed the 1 - methylbenzoselenazole methomethylsulphate as the alkyl quaternary salt. Thus, the character X in the above formulæ indicates any suitable acid radical such as a halide, p-toluensulfonate, alkylosulphate, nitrate, acetate, perchlorate or the like.

Figure 2:
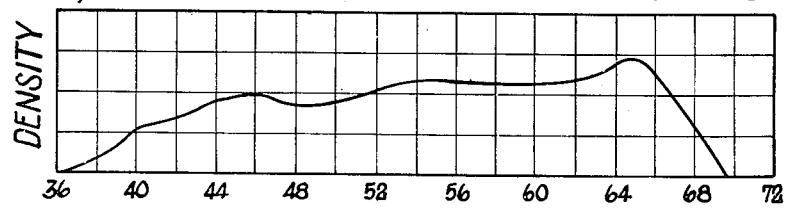
Figure 3:
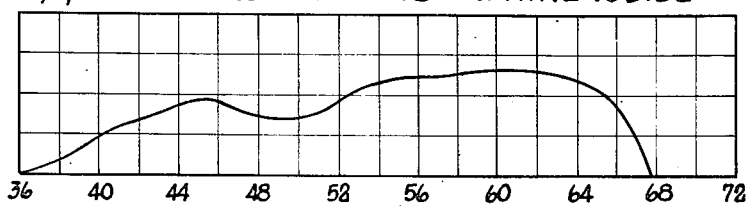

The diagrammatic spectrograms constituting the accompanying drawing illustrate the regions of the spectrum to which the various types of dye herein disclosed will sensitize a gelatino-silver-halide emulsion and the extent of the sensitization at various wave lengths. The figures of this drawing and the dye, the sensitizing properties of which each of the Figs. 1 to 3 illustrate, are listed, respectively, in connection with each spectrogram. These figures were all taken from silver bromide emulsions in which the respective dyes were incorporated as herein described; corresponding ones taken from chloride emulsions vary somewhat but are comparable in region and density.

In the preparation of emulsions containing my photographic sensitizers, it has been found that the dye may be dissolved in methyl alcohol and a volume of solution diluted with water and containing from 5 to 100 milligrams of dye added to 1000 cc. of emulsion, such, for instance, as the usual gelatino-silver, halide emulsion. While it may not be necessary to add some of the sensitizers in a large amount, it may be necessary to add others in amounts larger than those given above; generally about 10 to 20 milligrams is sufficient to obtain the maximum sensitizing effect with a dye having good sensitizing power. The more powerful dyes, however, may require much less. The regulation or adoption of the most economical proportions will be apparent to those skilled in the art upon observing the sensitizing power of the particular dye for the particular emulsion to be formed. The above examples are, therefore, illustrative and not to be understood as limiting the invention in any sense, as it will be apparent that these dyes may be incorporated by other methods in many of the photographic emulsions customarily employed in the art, such for instance as by bathing the plate or film, upon which the emulsion has been coated, in a solution of the dye in an appropriate solvent although this method of incorporating the dye in the emulsion is not preferred over that above described. Obviously the claims are all intended to cover any combination of these dyes with a photographic emulsion whereby the dye exerts a sensitizing effect upon the emulsions as well as a photographic element comprising a transparent support upon which the emulsion is coated or spread and permitted to dry.

What I claim is:

1. A photographic gelatino-silver-halide emulsion containing a cyanine dye which contains two benzoselenazole nuclei linked together by a tri-methenyl chain the hydrogen of the central carbon atom of which has been substituted by an alkyl, a substituted alkyl, an aryl or a substituted aryl group.

2. A photographic gelatino-silver-halide emulsion containing a cyanine dye which contains two benzoselenazole nuclei linked together by a tri-methenyl chain the hydrogen of the central carbon atom of which has been substituted by an alkyl group.

3. A photographic gelatino-silver-halide emulsion containing a cyanine dye which contains two benzoselenazole nuclei linked together by a tri-methenyl chain the hydrogen of the central carbon atom of which has been substituted by an aryl group.

4. A photographic gelatino-silver-halide emulsion containing a cyanine dye which contains two benzoselenazole nuclei linked together by a tri-methenyl chain the hydrogen of the central carbon atom of which has been substituted by a methyl group.

5. A photographic gelatino-silver-halide emulsion containing a cyanine dye which contains two benzoselenazole nuclei linked together by a tri-methenyl chain the hydrogen of the central carbon atom of which has been substituted by an ethyl group.

6. A photographic gelatino-silver-halide emulsion which contains a 2:2'-dialkyl-selenocarbocyanine salt substituted in the 8-position by an alkyl, a substituted alkyl, an aryl or a substituted aryl group.

7. A photographic gelatino-silver-halide emulsion which contains a 2:2'-dialkyl-8 alkyl-selenocarbocyanine salt.

8. A photographic gelatino-silver-halide emulsion which contains a 2:2':8-trimethyl selenocarbocyanine salt.

9. A photographic gelatino-silver-halide emulsion which contains a 2:2'-dimethyl-8-ethyl selenocarbocyanine salt.

10. A photographic gelatino-silver-halide emulsion which contains a 2:2':8-triethyl selenocarbocyanine salt.

11. A photographic gelatino-silver-halide emulsion which contains a 2:2'-dialkyl-8-alkyl-selenocarbocyanine halide.

12. As an article of manufacture, a supporting surface coated with a photographic gelatino-silver-halide emulsion containing a cyanine dye which contains two benzoselenazole nuclei linked together by a tri-methenyl chain the hydrogen of the central carbon atom of which has been substituted by an alkyl, a substituted alkyl, an aryl or a substituted aryl group.

13. As an article of manufacture, a supporting surface coated with a photographic gelatino-silver-halide emulsion containing a 2:2'-dialkyl-8 alkylselenocarbocyanine salt.

14. A photographic gelatino-silver-halide emulsion which contains a 2:2':8-trialkyl-selenocarbocyanine salt.

15. A photographic material comprising a silver-halide emulsion containing a cyanine dye which contains two benzoselenazole nuclei linked together by a tri-methenyl chain the hydrogen of the central carbon atom of which has been substituted by an alkyl group.

16. A photographic material comprising a silver-halide emulsion which contains a 2:2':8-trialkyl-selenocarbocyanine salt.

17. A photographic material comprising a silver-halide emulsion which contains a 2:2'-dialkyl-8-alkyl-selenocarbocyanine salt.

FRANK L. WHITE.